United States Patent [19]
Poore et al.

[11] 3,779,696
[45] Dec. 18, 1973

[54] PIPE HANDLING METHOD AND APPARATUS

[75] Inventors: Ernest C. Poore; John A. Goforth, both of Gadsden, Ala.

[73] Assignee: Midwestern Specialties Ltd., Tulsa, Okla.

[22] Filed: Apr. 25, 1972

[21] Appl. No.: 247,404

Related U.S. Application Data

[62] Division of Ser. No. 119,197, Feb. 26, 1971, Pat. No. 3,690,472.

[52] U.S. Cl............................ 432/6, 432/5, 432/86, 214/152, 118/423
[51] Int. Cl. ............................................ B65g 11/00
[58] Field of Search................. 263/52; 214/DIG. 3, 214/1 P, 152; 193/17, 38; 118/603; 198/103; 432/4, 5, 86, 6

[56] References Cited
UNITED STATES PATENTS

| | | | |
|---|---|---|---|
| 3,701,336 | 10/1972 | McConnell et al.................. | 214/1 P |
| 3,559,794 | 2/1971 | McConnell et al.................. | 214/1 P |
| 2,161,742 | 6/1939 | Gastrich............................. | 263/52 |
| 2,529,689 | 11/1950 | Hess..................................... | 263/52 |
| 3,655,071 | 4/1972 | Langowski et al.................. | 214/1 P |
| 932,571 | 8/1909 | Platter.......................... | 214/6 DK X |
| 2,114,974 | 4/1938 | Camerata..................... | 214/1 PB X |
| 3,108,699 | 10/1963 | Anschutz........................... | 214/1 P |
| 3,219,206 | 11/1965 | Cocker........................... | 214/16.4 R |
| 3,347,209 | 10/1967 | Groat...................... | 214/10.5 R X |
| 3,436,895 | 4/1969 | Pearne et al. .................. | 214/1 P X |

*Primary Examiner*—John J. Camby
*Assistant Examiner*—Henry C. Yuen
*Attorney*—William S. Dorman

[57] ABSTRACT

An apparatus for moving relatively large diameter sections of coated pipe through a treating stage such as a heating chamber in a manner wherein the coated portions of the pipe secions are not engaged, thus protecting the coating during the treating operation. The coated pipe is initially received by an elevator apparatus which moves the pipe to an intermediate station for transfer to a conveyor apparatus which moves the coated pipe through the treatment area, such as an oven or the like for discharge therefrom subsequent to the treating or heating operation. The pipe is supported in a manner precluding damage to the beveled pipe ends and precluding engagement with the coated portions thus greatly facilitating the coating of large diameter pipe.

3 Claims, 13 Drawing Figures

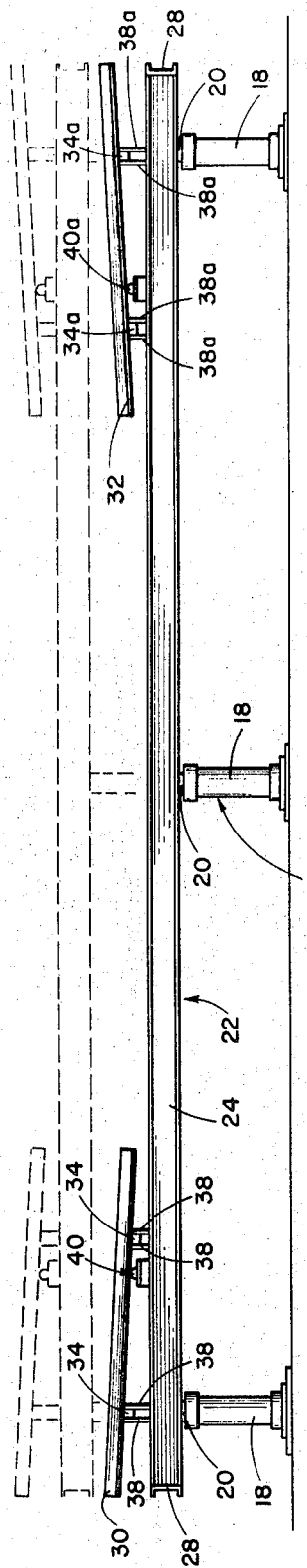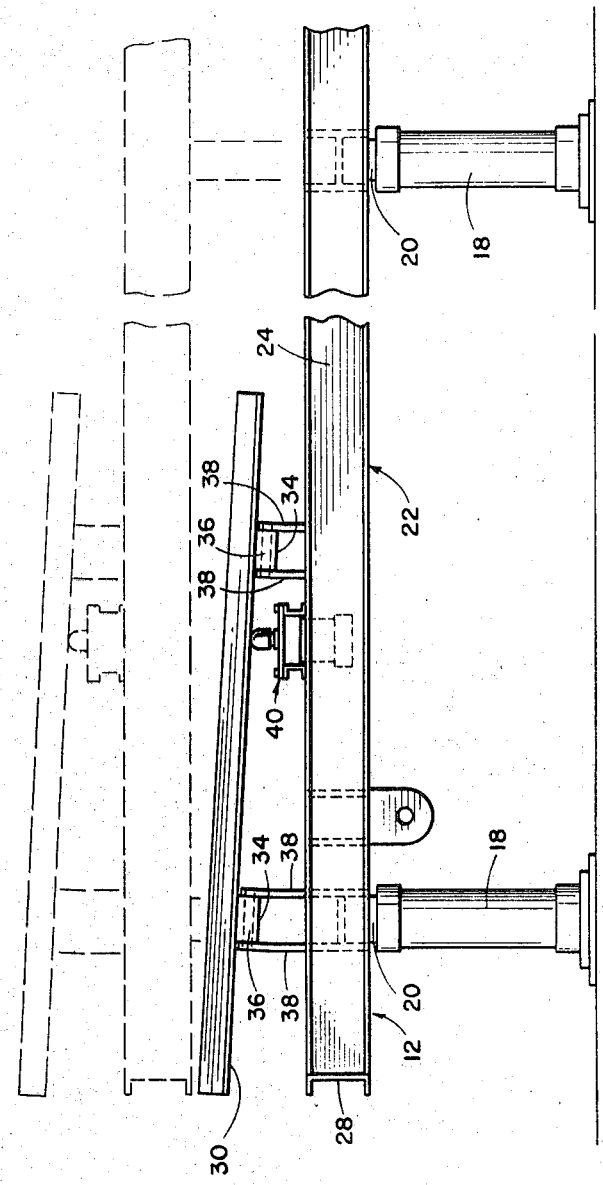
Fig. 3
Fig. 4

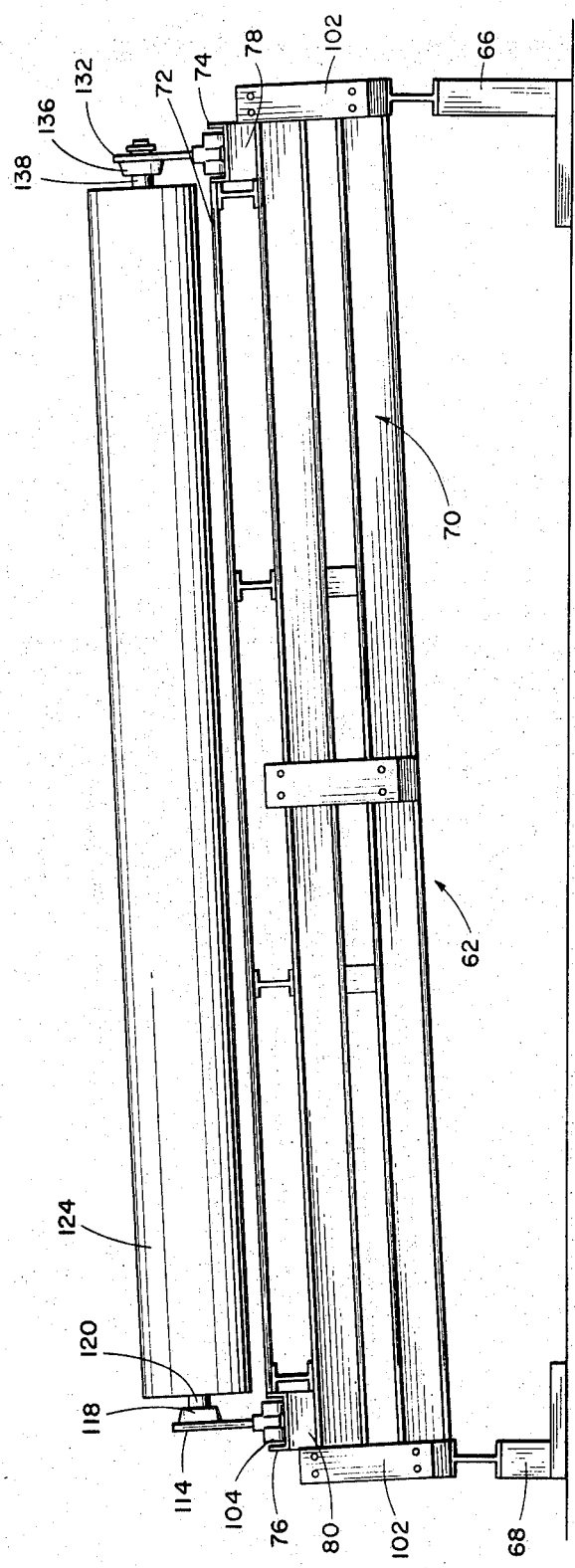
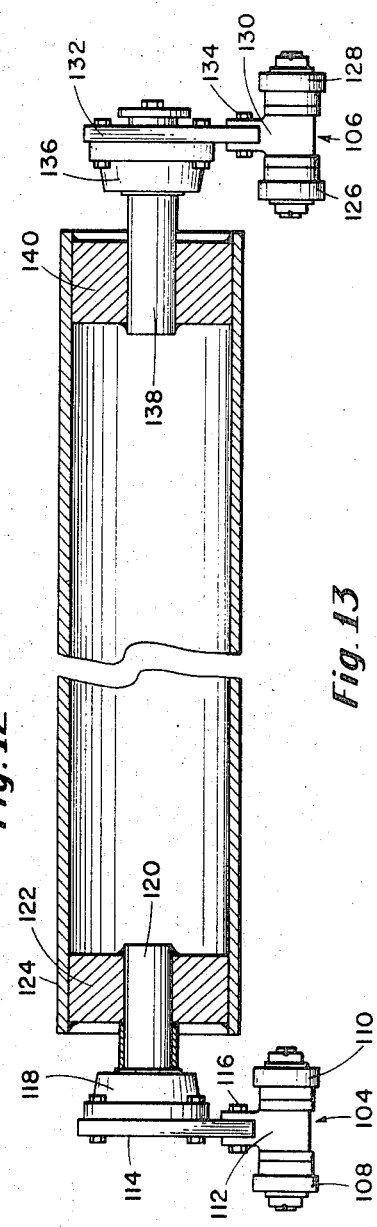
Fig. 12
Fig. 13

PIPE HANDLING METHOD AND APPARATUS

This invention is a division of our earlier co-pending application Ser. No. 119,197, filed Feb. 26, 1971, now U.S. Pat. No. 3690472, and entitled "Pipe Handling Method and Apparaus."

This invention relates to improvements in pipe handling method and apparatus and more particularly, but not by way of limitation, to an apparatus for moving coated pipe sections through a treatment chamber in a manner precluding damage to the coated sections of the pipe.

It is well known that the service life of steel pipes is greatly prolonged if outer periphery thereof is coated for protection against corrosion or other damage. Pipe is manufactured in varying diameters and is delivered in random lengths. The coating of relatively large diameter pipe is difficult, and is frequently accomplished by coating of the individual pipe sections at the mill site wherein the pipe is fabricated. It will be readily apparent that the size and weight of the large diameter pipe as well as the fact that the pipe sections vary in length are important factors in the difficulty of handling of the pipe sections, and the difficulty in coating thereof. During the coating operation it is important that the coated portions of the pipe be maintained free from contact to avoid damage to the coating material. In addition, it is important that the beveled pipe ends be undamaged since the bevel on the pipe ends is a part of the Code established by law for the pipe industry, and must be maintained within the limits so established. A apparatus for handling of large pipe sections during the coating thereof is disclosed in co-pending Stanley et al. application Ser. No. 56,822 filed July 21, 1970, and entitled "Method and Means for Coating Pipe" now U.S. Pat. No. 3,687,704 with which we are familiar. This particular apparatus is provided with end plug members for engaging the individual pipe sections in the opposite ends thereof only and moving the pipe from station to station during the coating operation.

The present invention contemplates a novel method and apparatus for receiving the pipe sections regardless of the length or diameter thereof during a coating operation and moving the pipe through a treatment stage, such as through a heating or curing oven, or the like, in a manner precluding engagement of the coated portions of the pipe and precluding damage to the beveled pipe ends. The novel apparatus comprises an initial elevator assembly adapted to receiving the coated pipe section from the pipe handling apparatus such as that disclosed in the aforementioned co-pending Richard C. Stanley application. The elevator apparatus supports the pipe section at the opposite ends thereof only, and in a manner particularly designed for precluding damage to either the beveled pipe ends of the coated portions of the pipe section. The elevator delivers the coated pipe section to an intermediate station for transfer to a conveyor apparatus which carries the pipe through the paticular treating area, such as an oven, for discharge at the end thereof. The conveyor apparatus is provided with a pair of spaced support beds extending substantially perpendicularly with respect to the pipe section supported thereon, and disposed at a planar angle in the transverse direction thereof whereby only the juncture between the pipe bevel and the straight outer periphery of the pipe is supported by the support beds. A plurality of rollers are spaced along each support bed and carried by complementary conveyor chains for urging the pipe sections along the support bed from the beginning thereof to the end thereof whereby the pipe sections will be moved through the treatment area. Of course, the speed of movement of the pipe sections along the support beds may be regulated by the speed of travel of the conveyor chains. At the end of the conveyor section, the pipe section may be deposited in the storage area, or the like, or may be picked up by the pipe handling apparatus as set forth in the aforementioned Richard C. Stanley co-pending patent application.

It is an important object of this invention to provide a novel pipe handling apparatus for facilitating the coating of the outer periphery of relatively large diameter pipe.

It is another object of this invention to provide a novel pipe handling apparatus for moving coated pipe through a treatment stage in a manner substantially precluding engagement with the coated portions of the pipe.

Another object of this invention is to provide a novel pipe handling apparatus for moving coated pipe through a treatment stage in a manner substantially precluding damage to the beveled pipe ends.

Still another object of this invention is to provide a novel pipe handling apparatus for moving coated pipe sections through an oven, or the like, which is simple and efficient in operation and economical and durable in construction.

Other and further objects and advantageous features of the present invention will hereinafter more fully appear in connection with a detailed description of the drawings in which:

FIG. 3 is a front elevational view of the initial elevator apparatus utilized in the pipe handling apparatus embodying the invention.

FIG. 4 is a broken view similar to FIG. 3, but enlarged for purposes of illustration.

FIG. 12 is an elevational view of one support bed taken substantially on line 12—12 of FIG. 2, with portions eliminated for purposes of illustration.

FIG. 13 is an enlarged elevational view of the rollers utilized in the conveyor portion of the pipe handling apparatus, with portions depicted in section for purposes of illustration.

Figure 1:
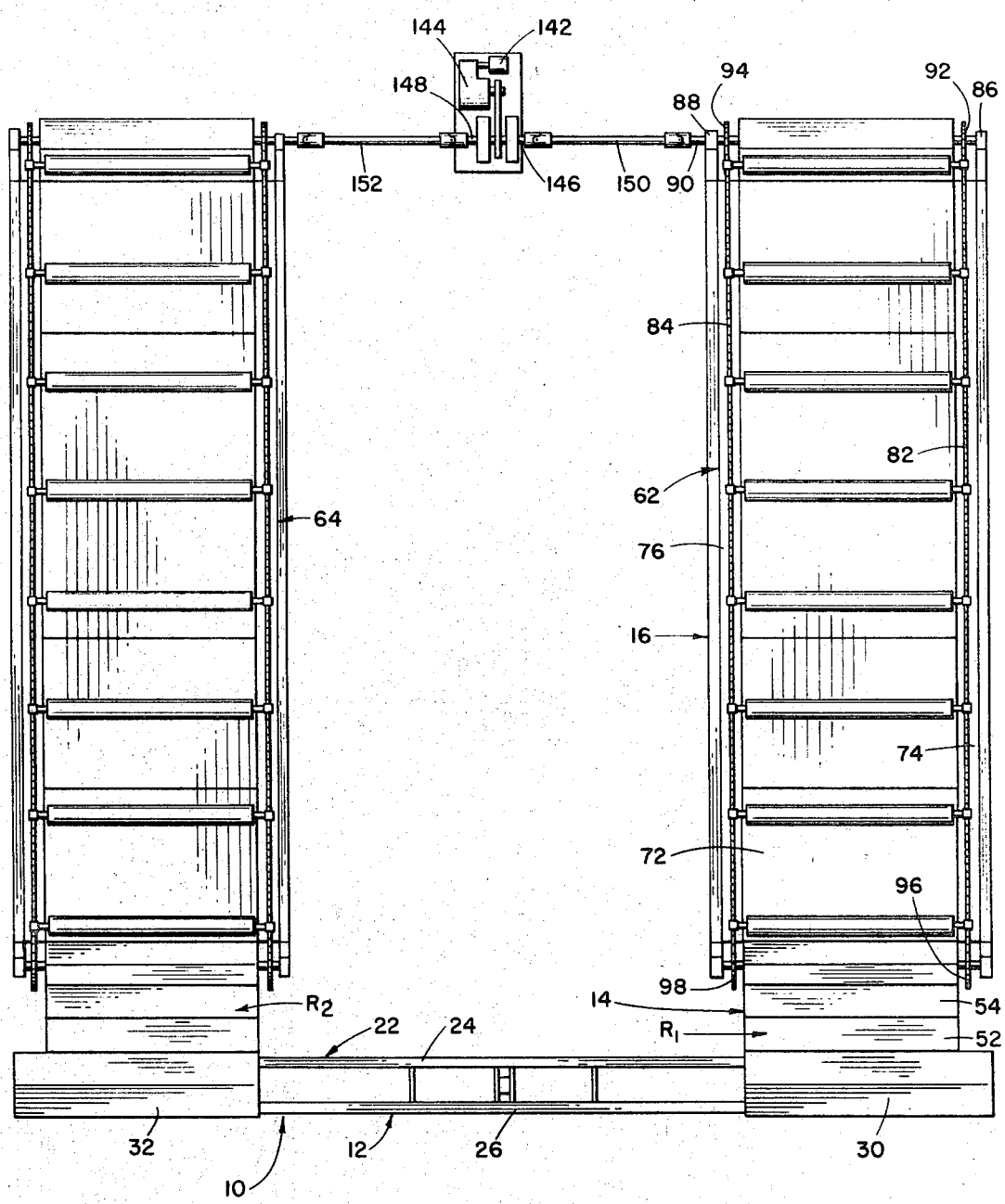
FIG. 1 is a plan view of a pipe handling apparatus embodying the invention.

Referring to the drawings in detail, reference character 10 generally indicates a pipe handling apparatus comprising an initial pipe receiving elevator assembly 12, an intermediate pipe transfer section 14, and a pipe conveyor apparatus 16. The pipe elevator assembly 12 is positioned or installed for initially receiving a coated pipe section P from a pipe handling apparatus 17 (FIG. 5) of any suitable type such as that shown in the aforementioned Richard C. Stanley co-pending application. The pipe P is delivered to the intermediate pipe transfer section 14 by the elevator apparatus 12 in a manner as will be hereinafter set forth in detail. The transfer section 14 transfers the pipe P to the conveyor apparatus 16 which is preferably substantially entirely disposed within the treating area, such as an oven or the like (not shown) wherein the pipe P is moved through the treating area at the most desirable speed for the treating, such as heating, to be accomplished.

The pipe elevator assembly 12, as particularly shown in FIGS. 3 through 7, comprises a plurality of spaced upright cylinders or pillars 18 each having a reciprocal ram 20 therein for supporting a cross beam 22. The cylinders or sleeves 18 and complementary rams 20 are preferably of a hydraulic cylinder type construction whereby the rams 20 are hydraulically actuated in unison or synchronization in any suitable or well known manner (not shown) in order that the elevational position of the cross beam 22 may be varied from the lowermost position thereof as shown in solid lines in FIGS. 3 and 4 to the uppermost position thereof as shown in dotted lines in FIGS. 3 and 4. The cross beam 22 may be of any suitable construction and as shown herein comprises a pair of spaced I-beams 24 and 26 extending between the posts or supports 18 in substantial alignment with the longitudinal axis of the pipe P to be supported by the apparatus 10, and substantially perpendicular to the path of travel of the pipe P through the apparatus 10 as will be hereinafter set forth. The I-beams 24 and 26 are secured in spaced relation by a plurality of transversely extending I-beams or channel members 28 welded or otherwise secured therebetween, as is well known.

Figures 5, 6, 7:
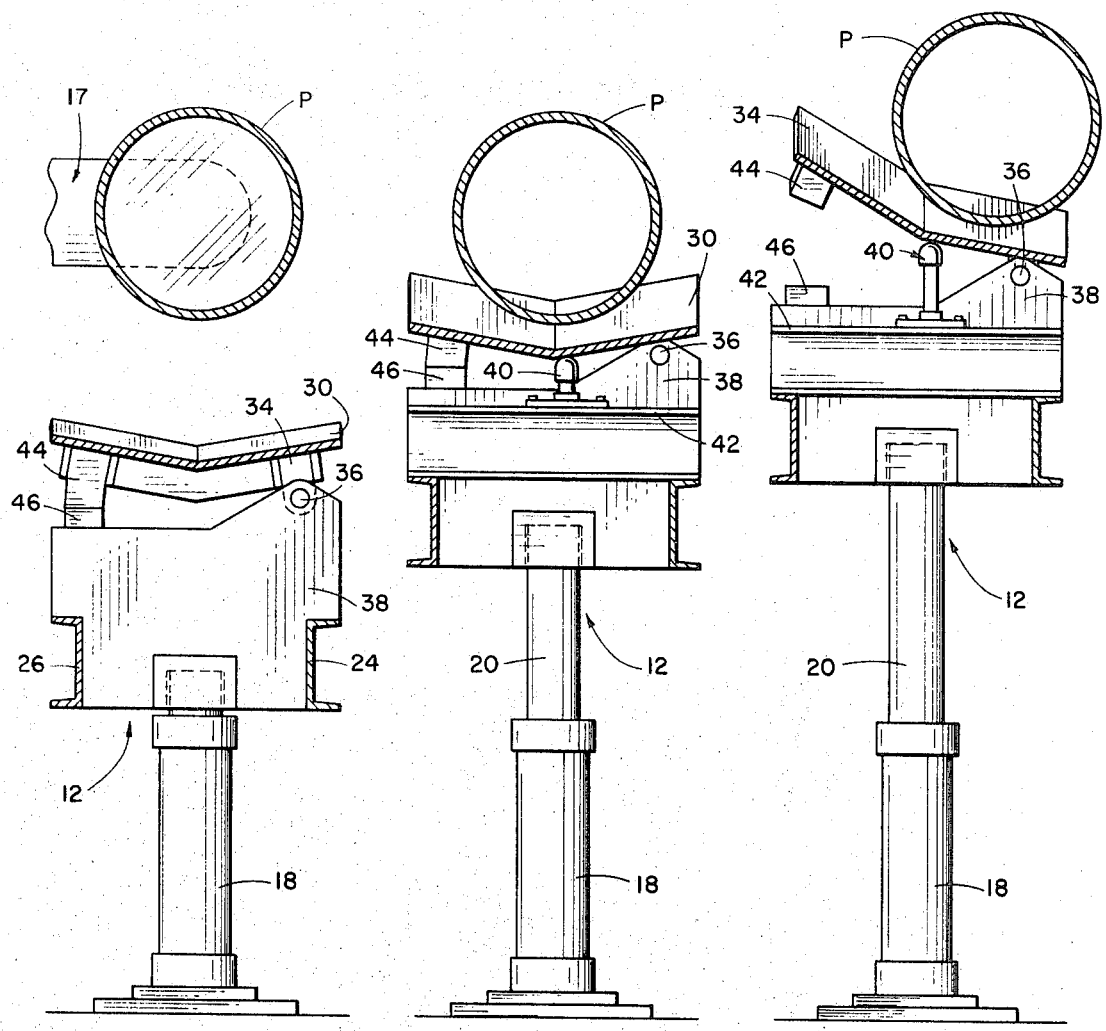
FIG. 5 is a side elevational view partly in section of the elevator apparatus of the invention immediately prior to receiving a pipe section thereon.
FIG. 6 is a view similar to FIG. 5 depicting the pipe section as initially supported on the elevator apparatus.
FIG. 7 is a view similar to FIG. 6 depicting the pipe section being ejected from the elevator apparatus.

A pair of oppositely disposed support plates 30 and 32 are secured in the proximity of the opposite ends of the beam 22 as particularly shown in FIG. 3 for supporting the pipe P in a manner as will be hereinafter set forth. The plates 30 and 32 are preferably substantially identical and consequently only the plate 30 will be described in detail herein. The plate 30 is of a substantially wide angle V-shaped cross-sectional configuration and is secured to the cross beam 22 in any suitable manner for pivoting in a transverse direction with respect to the length thereof. As shown herein, a plurality of downwardly depending flanges 34 (only one of which is shown) in FIGS. 5, 6 and 7 are longitudinally spaced along the lower surface of the plate 30 and are pivotally secured at 36 to complementary upstanding flanges 38 provided on the cross beam 22. The flanges 38 are welded or otherwise secured between the I-beams 24 and 26 and are preferably of descending dimension in height, or vertical dimension whereby the outermost flange 38 in th proximity of the outer end of the cross beam 22 extends upwardly therefrom a greater distance than the flanges 38 spaced inwardly therefrom. In this manner the support plate 30 is secured to the cross beam 22 at an angle in the longitudinal direction thereof with respect to the cross beam 22, as clearly shown in FIGS. 3 and 4, and for a purpose as will be hereinafter set forth. In addition, a hydraulic piston assembly 40 is secured to an I-beam 42, or the like, which is secured between the beams 24 and 26 in the proximity of the longitudinal center of the support plate 30, as is particularly shown in FIGS. 6 and 7. The piston assembly 40 may be actuated in any well known manner for selectively pivoting the plate 30 in the transverse direction thereof about the pivots 36. It is also preferable to provide a pair of complementary stop members or bumpers 44 and 46 on the plate 30 and flange 38, respectively, for limiting the pivotal movement of the plate 30 in a counter-clockwise direction as viewed in FIGS. 5 and 7.

Figure 8:
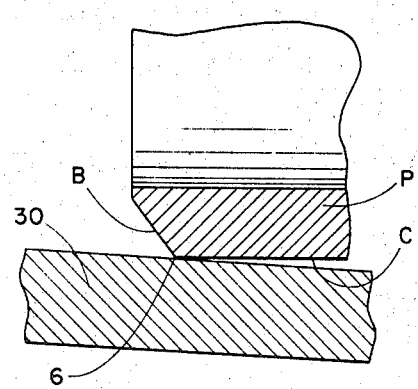
FIG. 8 is an enlarged section view depicting the support relationship between a pipe section and the support members of the pipe handling apparatus during all times when the pipe is being supported by the apparatus.

The plate 32 is similarly secured to the cross beam 22 by the complementary flanges 34a and 38a and a similar piston assembly 40a is provided for similarly pivoting the plate 32. The piston assemblies 40 and 40a are synchronized in any well known manner (not shown) for simultaneous activation thereof. The coated pipe P is suspended above the elevator apparatus 12 by the pipe handling apparatus 17, and the rams 20 are activated in the usual manner for raising the cross beam 22 upwardly in a direction toward the pipe P. The piston assembly is preferably maintained with the piston in the lowermost position thereof as shown in FIG. 6. As the rams 20 move upwardly, the support plates 30 and 32 are moved upwardly therewith until the plates 30 and 32 are brought into engagement with the outer periphery of the pipe P. Due to the angular position of the plates 30 and 32 with respect to the longitudinal axis of the pipe P, each support plate 30 and 32 will engage the opposite ends of the pipe P only at the juncture J between the pipe bevel B and the straight sides or coated portion C of the pipe, as particularly shown in FIG. 8. Thus, no damage can occur to either the pipe bevel B or the coated portion C of the pipe. It will be apparent that the wide angle V-shaped configuration of the support plates 30 and 32 will cradle the pipe section P therein and the plates 30 and 32 will support the pipe P at a position spaced above the cross beam 22, as determined by the length of extension of the rams 20.

The rams 20 may be either extended or contracted subsequent to engagement of the pipe P, as desired for the subsequent handling of the pipe P for passage through the apparatus 10. As depicted herein, the rams 20 are further extended, as shown in FIG. 7, and the piston assemblies 40 and 41a are actuated for extending the piston members thereof whereby the plates 30 and 32 are simultaneously pivoted in a clockwise direction about the pivots 36 as viewed in FIGS. 6 and 7. As the plates 30 and 32 are simultaneously pivoted, the pipe section P is rolled into the transfer section 14 in a manner as will be hereinafter set forth. Subsequent to delivery of the pipe P to the transfer station 14, the piston assembly 40 may be actuated for contracting the piston thereof and permitting the plates 30 and 32 to pivot in an opposite direction for engagement of the stops 44 and 46.

The intermediate pipe receiving station 14 comprises a pair of spaced substantially identical units $R_1$ and $R_2$ (FIG. 1) disposed in substantial alignment with the support plates 30 and 32 of the elevator assembly 16 for receiving the pipe P therefrom. Only the unit $R_1$ will be described in detail, it being understood that the two units $R_1$ and $R_2$ operate in unison and are synchronized for complementary action during the handling of the pipe P.

Figure 11:
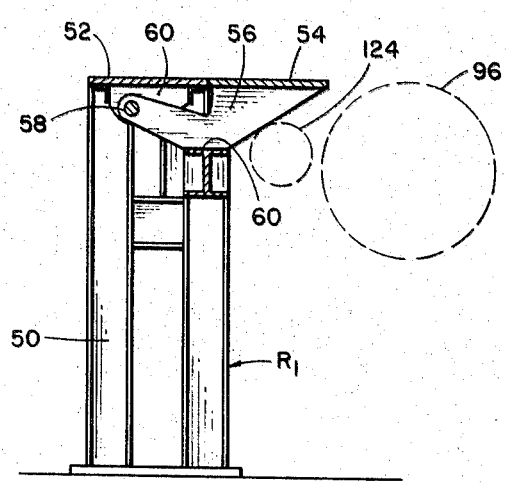
FIG. 11 is a view similar to FIG. 10 depicting the intermediate pipe receiving station in a position immediately subsequent to releasing a pipe section therefrom.
Figure 10:
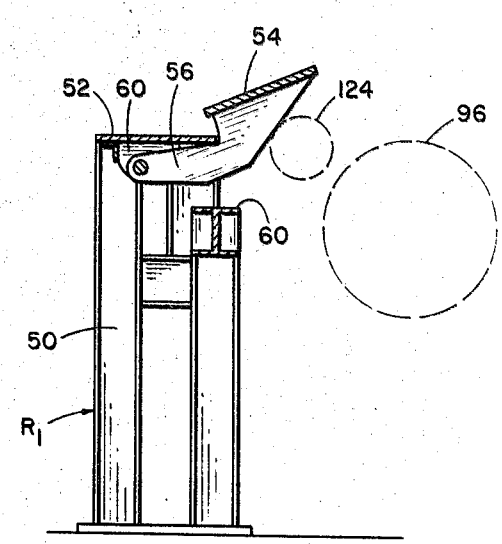
FIG. 10 is a side elevational view partly in section of the intermediate pipe receiving station in a position for receiving a pipe section from the elevator apparatus.

The unit $R_1$ (FIGS. 2, 10 and 11) comprises a suitable upright support frame 50 which may be of any suitable construction, such as a plurality of spaced structural beam members, or the like, as desired. An upper support plate member 52 is secured to the support member 50 in any suitable manner, and is preferably of a length complementary to the length of the support plate 30 of the elevator apparatus 12, but not limited thereto. The support plate 52 is disposed at an angle with respect to the horizontal axis of the pipe P moving through the apparatus 10, and is preferably at substantially the same angular disposition as the plate 30 whereby the pipe P will be engaged only at the juncture J as hereinbefore set forth. A second support plate 54 generally similar to the plate 52 and disposed in angular alignment therebetween is carried by a plurality of spaced angular arm members 56 (only one of which is shown in the drawings) and the arm members 56 are each pivotally secured at 58 to complementary flanges or brackets 60 (only one of which is shown in the drawings) welded or otherwise secured to the lower surface of the plate 52. The support frame 50 is provided with recess portions or cut-away portions 60 in the proximity of each arm 56 to permit pivoting of the arms 56, and as shown in FIGS. 10 and 11, the counterclockwise rotation of the arms 56 is limited by the engagement of the arms 56 with the plate 52, and the clockwise rotation of the arms 56 is limited by the engagement of the arms 56 with the bottom of the recess 60 of the frame 50. The arms 56, however, are freely rotatable about the pivots 58 within these limits in a manner as will be hereinafter set forth.

When the pipe P is delivered to the transfer section 14, the plates 52 are normally in the position shown in FIG. 10 wherein the arms 56 are in the uppermost position thereof. The pipe is engaged by both the plates 52 and 54, and only at the juncture J thereof, as hereinbefore set forth. Of course, each unit $R_1$ and $R_2$ engages the pipe at the opposite ends thereof in similar and coordinated actions and support the pipe P upon delivery thereof from the elevator apparatus 12 subsequent to receiving the pipe P, the arms 56 are pivoted in a clockwise direction about the pivot 58, as viewed in the drawings, and to the position shown in FIG. 11 in a manner as will be hereinafter set forth. The pipe P may then move or be moved onto the conveyor apparatus 16.

The conveyor apparatus 16 comprises a pair of substantially identical pipe end support beds 62 and 64 which are disposed in substantial parallel relationship to each other, and extend substantially perpendicularly from the cross beam 22 of the elevator apparatus 12. In addition, each support bed 62 and 64 is disposed in substantial alignment with the support plates 30 and 32, respectively, and support plates 52 and 54 of the transfer units $R_1$ and $R_2$, respectively. The support beds 62 and 64 are substantially identical and function in synchronization, and only the support bed 64 will be described in detail herein.

Figure 2:
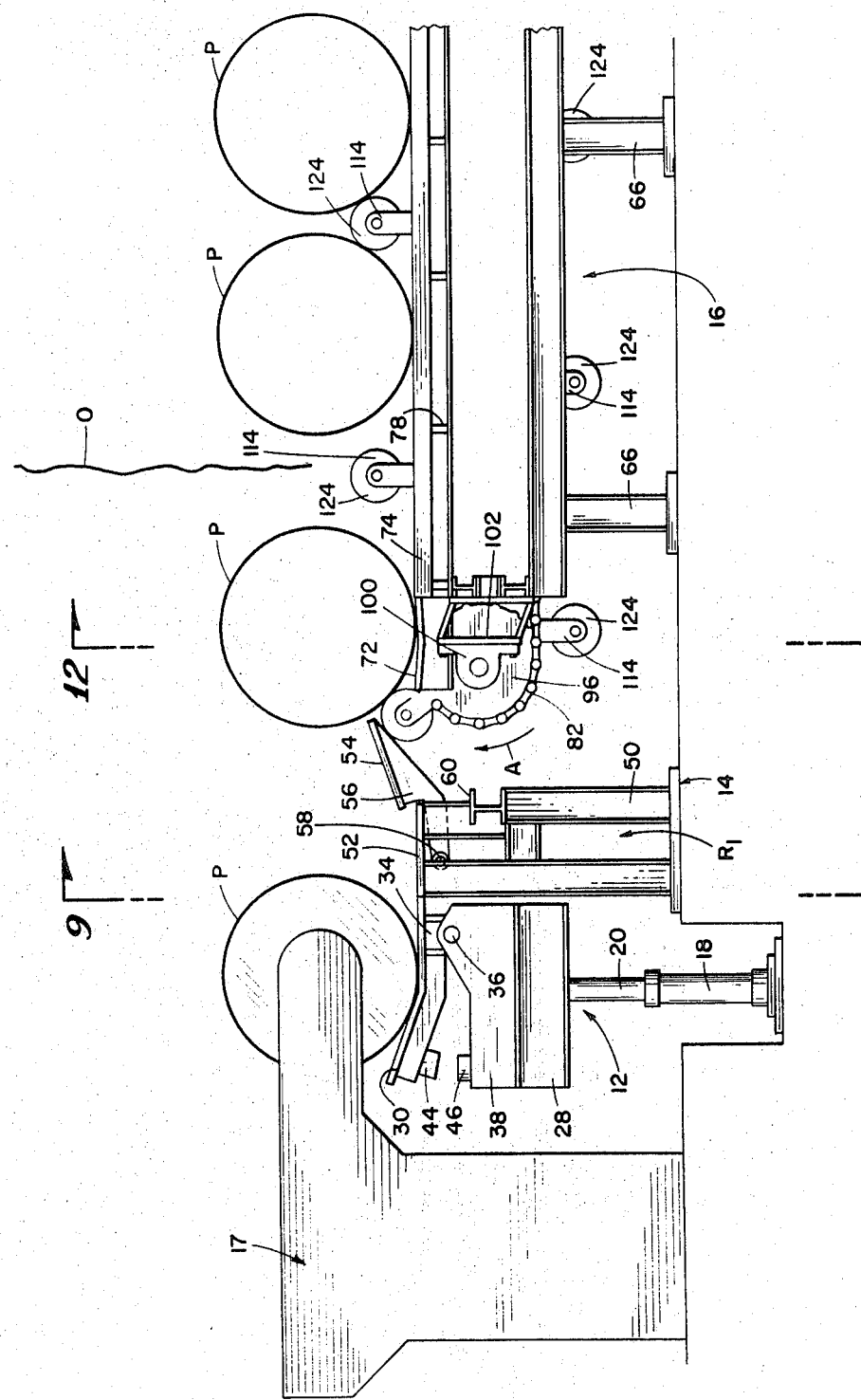
FIG. 2 is a side elevational view of a pipe handling apparatus embodying the invention with portions thereof eliminated for purposes of illustration.

Referring now to FIGS. 1, 2 and 12, the support bed assembly 64 comprises a plurality of pairs of transversely aligned leg supports 66 and 68 spaced longitudinally along the assembly 64 and at the opposite sides thereof whereby each complementary pair of legs 66 and 68 supports a cross beam structure generally indicated at 70 in FIG. 12. The leg members 68 are of a shorter height than the leg supports 66 whereby the cross beam structure is disposed at an angle with respect to the horizontal, and the angle thereof is complementary to or substantially identical with the angular disposition of the plate 30 of the elevator apparatus 12 and the plates 52 and 54 of the transfer section 14. An elongated support bed 72 is secured to the cross beam assembly 70 in any suitable manner and extends substantially throughout the length of the support bed assembly 64 in a direction substantially perpendicular to the cross beam 22 of the elevator assembly 12 for a purpose as will be hereinafter set forth. The support bed 72 is disposed at a transverse angle, as particularly shown in FIG. 12, complementary to the angular disposition of the crossbeam assembly 70 whereby the bed 72 engages the pipe P only at the juncture J thereof as hereinbefore set forth.

A pair of oppositely disposed longitudinally extending channel members 74 and 76 are secured to the assembly 70 along the opposite edges of the bed 72 in any suitable manner, such as by a plurality of spaced spacers 78 and 80, respectively. The channel members 74 and 76 are open along the upper edge thereof for receiving a conveyor chain 82 and 84, respectively, therein for a purpose and in a manner as will be hereinafter set forth. A pair of pillow block bearings 86 and 88, or the like, are suitably mounted on the right hand end of the channels 74 and 76, respectively, as viewed in FIG. 1, for rotatably supporting a drive shaft 90. A pair of drive sprockets 92 and 94 are keyed or otherwise secured to the shaft 90 for simultaneous rotation thereby. The sprockets 92 and 94 are secured in the proximity of one end of the channels 74 and 76, respectively, and a pair of complementary idler sprockets 96 and 98 are mounted in the proximity of the opposite ends of the channels 74 and 76, respectively, in any suitable manner, such as by pillow block bearing 100 mounted on a support bracket 102 which in turn is mounted on the cross beam assembly 70. The conveyor chain 82 is an endless chain and extends around and between the complementary sprockets 92 and 96. The conveyor chain 84 is a similar endless chain and extends around and between the complementary sprockets 94 and 98. As the drive sprockets 92 and 94 are rotated simultaneously by the shaft 90, as will be hereinafter set forth, the chains 82 and 84 are moved simultaneously and in a synchronized manner for a purpose as will be hereinafter set forth.

A plurality of roller assemblies 104 and 106 are spaced along the chains 82 and 84, respectivley, and rid in the channels 74 and 76, respectively, as the chains are moved by the respective sprockets. The roller assemblies 104 and 106 are substantially identical and as shown herein the assembly 104 comprises a pair of rollers 108 and 100 suitably journalled on the opposite sides of a bifurcated link member 112 which is interposed in the chain 82, and in essence is a link of the chain. Of course, the links 112 may be spaced along the chain 82 at substantially any desired distance therebetween. An arm 114 is bolted or otherwise secured to the link member 112, as shown at 116 in FIG. 13 and extends outwardly therefrom for supporting a suitable journal box 118, or the like, on the inwardly directed face thereof. A pivot stub or shaft 120 is carried by the journal box for rotation about its longitudinal axis, and is provided with an annular collar member 122 which supports one end of a roller 124.

The roller assembly 106 comprises a pair of roller members 126 and 128 suitably journalled on the opposite sides of a bifurcated link member 130 similar to the link 112, and the link member 130 is interposed in the chain 84 in such a manner as to be in alignment with the complementary link 112 of the roller assembly 106. An arm 132 similar to the arm 114 is bolted or otherwise secured to the link 130 at 134 for supporting a suitable journal box 136 or the like, similar to the box 118. A stub shaft or pivot shaft 138 is carried by the box 136 for rotation about its longitudinal axis and is in substantial axial alignment with the pivot shaft 120. A hub or annular collar 140 is provided on the shaft 138 for supporting the opposite end of the roller 124 with respect to the collar 122. The roller 124 extends transversely across the plate or bed 72 and is spaced therefrom as shown in FIG. 12, and is supported at an angle parallel to the transverse angle of the bed 72. The roller 124 is freely rotatable for a purpose as will be hereinafter set forth.

Referring more particularly to FIG. 1, a motor or power source 142 is suitably mounted approximately centrally between the support bed assemblies 62 and 74, and preferably in the proximity of drive sprocket ends thereof. The motor 142 is operably connected with a suitable transmission assembly or gear train 144 for driving a pair of aligned oppositely extending drive shafts 146 and 148, as is well known. The drive shaft 146 is suitably coupled with a shaft extension member 150 which in turn is suitably coupled with the drive shaft 90 of the drive sprockets 92 and 94. The drive shaft 148 is similarly connected with a shaft extension member 152 which is in alignment with the shaft extension 140 and extends in an opposite direction therefrom for similar connection with the drive sprockets of the support bed assembly 64. Thus, the drive sprockets of both the support bed assemblies 62 and 64 are driven in unison and are suitably synchronized for a purpose as will be hereinafter set forth.

Figure 9:
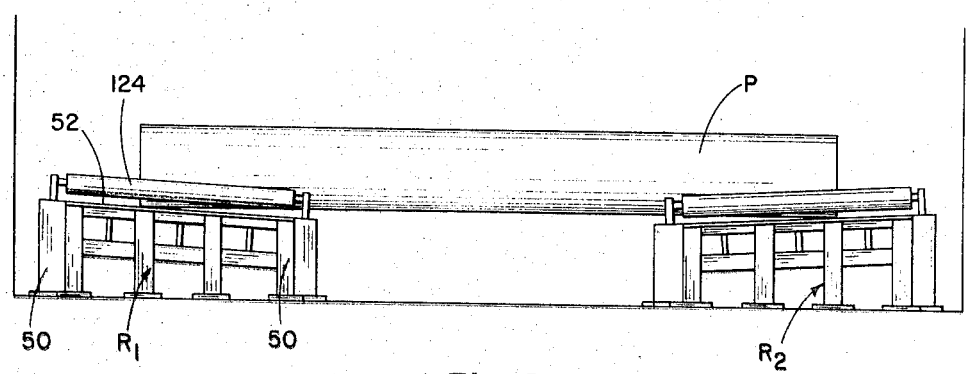
FIG. 9 is a view taken on line 9—9 of FIG. 2.

The conveyor apparatus 16 is disposed in the proximity of the transfer apparatus 14 for receiving the pipe P therefrom. When the arms 56 of the transfer device 12 are in the lowermost position thereof, as shown in FIG. 11, the pipe P is deposited or directed onto the support beds 72 of the conveyor apparatus 16, as shown in FIG. 2. As hereinbefore set forth, and as shown in FIG. 9, the opposite ends of the pipe P are supported by the support bed portions 62 an 64, with only the juncture J of each pipe end being engaged by the support bed plates 72 of the portions 62 and 64. As the chains 82 of the portions 62 and 64 are moved in the direction indicated by the arrow A in FIG. 2, the roller assemblies 104 and 106 move around the sprocket 96 in a clockwise direction as viewed in FIG. 2. As the roller assemblies move around the sprocket 96, the rollers 124 are moved upwardly and engage the arms 56, as shown schematically in FIG. 11. A continued movement of the chain 82 and roller assemblies 104 and 106 around the sprocket 96 moves the rollers 124 further upwardly and in a direction away from the transfer unit 14. As the rollers 124 thus move, the arms 56 of the transfer unit 14 are pivoted in a counterclockwise direction about the pivot 58 to the position shown in FIGS. 2 and 10. This positions the plane of the plate 54 at an angle with respect to the plane of the plate 52, and limits any rolling action of the pipe P in a direction toward the transfer unit 14.

In addition, the aligned and coordinated rollers 124 of each portion 62 and 64 are moved into engagement with pipe P, and as the chain 82 continues to move, the rollers 124 urge the pipe P along the support beds 72. It is to be noted that the rollers 124 and support beds 72 engage the pipe only at the juncture J at the opposite ends of the pipe, thus assuring that the coated portion C and beveled ends B thereof will not be damaged as the pipe P moves through the apparatus 10. Of course, a plurality of pipes P may be moved through the apparatus 10 simultaneously as shown in FIG. 2, and as will be hereinafter set forth, and subsequent to passage of the pipe P along the entire length of the conveyor apparatus 16 the pipe may be discharged from the conveyor apparatus 16 at the end opposite thereof oppositely disposed from the transfer device 14 in any suitable manner (not shown) whereupon the pipe may be further treated, or may be moved to a storage area, or the like.

In operation, a pipe P to be handled by the apparatus 10 may be initially deposited thereon by the pipe handling apparatus 17. By way of example, assuming the outer periphery of the pipe P has been coated on the straight portions C thereof (FIG. 8) in the manner as set forth in the aforementioned Stanley co-pending application and the coated pipe is to be heated for curing of the coating, or otherwise completing the coating operation, the conveyor apparatus 16 is substantially entirely disposed within the oven (not shown) with the oven curtain O being substantially in the position shown schemically in FIG. 2. The apparatus 17 initially supports the coated pipe P in substantial alignment with the elevator apparatus 12, as more particularly shown in FIG. 5. The plate or kicker members 30 and 32 of the elevator 12 in normally the lowered position thereof with the stop members 49 and 46 in engagement as shown in FIG. 5. The rams 20 may be actuated in the usual manner for elevating the kickers 30 and 32 into engagement with the juncture J at the opposite ends of the pipe P, as shown in FIG. 6. The hydraulic cylinder assemblies 40 and 40a are then simultaneously actuated in the usual manner for pivoting the kickers 30 and 32 in a clockwise direction about the pivots 36 as viewed in the drawings. The kickers 30 and 32 are in synchronization and efficiently "kick" or move the pipe P onto the plats 52 and 54 of the transfer device 14.

If the conveyor apparatus 16 is "ready" for receiving the pipe P, none of the rollers 124 will be in engagement with the arms 56 of the transfer device 14, and the pipe P will roll directly onto the beds 72 of the conveyor apparatus 16. Of course, the rolling of the pipe P will be initiated by the discharge of the pipe from the elevator 12 by the kickers 30 and 32. In the event a pipe section is already on the conveyor apparatus 16 in such a position that the apparatus 16 is not "ready" for receiving a succeeding pipe section, the rollers 124 of the chains 82 will be in engagement with the arms 56 of the transfer device 14 whereby the plate 54 will be tilted upwardly as shown in FIG. 10. In this position, the pipe section P will be retained on the transfer device 14 (and in some instances on a portion of the elevator 12), in addition to which, the pipe section P already deposited on the conveyor apparatus 16 will be precluded from rolling back onto the transfer device 14 or otherwise engaging the pipe section on the transfer device.

When the pipe section P has been deposited on the support beds 72 of the conveyor apparatus 16, the rollers 124 of the support bed strcutures 62 and 64 will be moved into engagement with the juncture J of the opposite ends of the pipe section for facilitating movement of the pipe P along the length of the support beds 72. It will be readily apparent that the spacing of the rollers 124 along the chains 82 is preferably such that a roller 124 is disposed between each pair of succeeding pipe sections P to be deposited on the apparatus 10. In this manner, each pipe section P may be facilitated in its movement along the beds 72, and furthermore, the rollers 124, being disposed between each pair of pipe sections, positively preclude any engagement between the coated portions C of adjacent pipe sections. Of course, the rollers 124 are spaced above the upper surface of the beds 72 a sufficient distance to assure that the adjacent pipe sections cannot accidentally come into engagement, as particularly shown in FIG. 2.

When the pipe section P has travelled the entire length of the conveyor apparatus 16, the pipe will normally be completely heated, and the heated pipe may either be discharged from the support beds 72 onto an exit elevator apparatus (not shown) similar to the elevator apparatus 12 and transferred to a storage area, or may be engaged by another pipe handling apparatus 17 for movement to another treatment stage, as required or as desired in the pipe coating operation.

It will be apparent that only the juncture J of the opposite ends of each pipe section P are engaged by any portion of the pipe handling apparatus 10 as the pipe sections move therethrough. Thus, the coated portion C and beveled ends B of the pipe sections is not engaged at any time during the heating operation, and cnsequently cannot be damaged while passing through the apparatus 10.

From the foregoing it will be apparent that the present invention provides a novel pipe handling method and apparatus for pipe sections of substantially any length or diameter wherein coated pipe sections, or the like, are initially deposited on an elevator apparatus and are supported thereon in a manner wherein the beveled pipe ends and the coated portion of the pipe section is not engaged. Kicker members on the elevator apparatus discharge the coated pipe sections individually onto a transfer device which is also particularly designed and constructed for precluding engagement with the beveled pipe ends and coated portions of the pipe. The transfer device deposits the coated pipe sections on a conveyor apparatus, and the conveyor apparatus and transfer device cooperate in such a manner as to deposit a pipe section on the pipe support beds only at the proper spacing between adjacent pipe sections being moved through the pipe handling apparatus. The conveyor apparatus supports the pipe ends in a manner precluding engagement with the end bevels and coated portions of the pipe, and the conveying rollers move the pipe sections along the support beds in a manner assuring protection of the coated pipe section throughout the entire length of the conveyor apparatus. The novel pipe handling apparatus is simple and efficient in operation and economical and durable in construction.

Whereas the present invention has been described in particular relation to the drawings attached hereto, it should be understood that other and further modifications, apart from those shown or suggested herein, may be made within the spirit and scope of this invention.

What is claimed is:

1. A method of handling coated pipe sections of substantially any length and diameter and having beveled ends, comprising the steps of initially receiving the coated pipe by supporting the pipe at the outer periphery of the ends thereof only at the juncture between the coated portion and the beveled portion, transfering the coated pipe to a conveying apparatus and engaging only the said outer periphery of the ends during the transfer operation, supporting the pipe only at the said outer periphery of the opposite ends thereof while moving the pipe along the conveying apparatus, treating the coated pipe section during movement thereof along the conveying apparatus, and removing the treated pipe section from the conveying apparatus.

2. A method of handling coated pipe sections as set forth in claim 1 and including the moving of the pipe sections along the conveying apparatus by engaging of the said outer periphery of the ends by roller members, and moving the roller members along the conveying apparatus for moving the pipe sections therealong and precluding engagement between adjacent pipe sectons.

3. A method of handling coated pipe sections as set forth in claim 2 wherein the opposite ends of the pipe section are engaged simultaneously by roller members, and moving the rollers in synchronization for facilitating movement of the pipe section along the conveying apparatus.

* * * * *